United States Patent Office

2,973,243
Patented Feb. 28, 1961

2,973,243

PROCESS FOR PRODUCING THREADS, FOILS, TUBES AND THE LIKE FROM AMYLOSE AND/ OR STARCH CARBOHYDRATES CONTAINING AMYLOSE

Dieter Kudera, Quintusstrasse 120, Walsrode, Germany

No Drawing. Filed Aug. 26, 1958, Ser. No. 757,205

7 Claims. (Cl. 18—54)

It is known to prepare solutions of amylose and/or of starch carbohydrates containing amylose in water at temperatures of at least 120° centigrade with or without addition of substances forming complexes and to shape from these solutions foils by casting upon plane supports and by subsequent drying. This method of manufacturing foils is complicated and expensive and, therefore, unsuitable for the mass-production and, furthermore, does not allow the production of threads and tubes. There is not as yet a practical solution of the problem to create in a continuous technical and economical process foils, threads and tubes and similar structures as serial products from spinning solutions of amylose or/and of amylose containing starch carbohydrates by means of forming slit or ring nozzles and of coagulating precipitation baths similarly as, for instance, from viscose or alginate solutions.

According to the invention, a spinning solution suitable for producing continuously threads, sheets, tubes and the like from amylose and/or from amylose containing starch carbohydrates is obtained by dissolving amylose and/or amylose containing starch carbohydrates in the twofold to sixfold quantity of a mixture of water and formaldehyde at temperatures of about 120° C. and by adjusting the viscosity of the solution to about 50 to 300 poises and the pH-value of the solution to 2.5–3.5. It is particularly advantageous to solve the amylose or the amylose containing starch carbohyrates in the 2.5- to 3-fold quantity of a mixture of water and formaldehyde containing preferably about 10% formaldehyde.

The adjustment of the pH-value takes place, according to the invention, after the preparation of the solution preferably to 2.8 to 3.1 and may be effected by means to organic or of inorganic acids, particularly of phosphoric acid and/or sulphuric acid. The adjustment of the viscosity to the value of 20 to 300 poises may be advantageously realised by the ripening i.e. by the storing of the solution preferably at room temperature. The amylose solution prepared according to the invention has a storing capacity which, although limited, suffices for practical purposes and is well suited on account of its composition and its viscosity and of its pH-value for being shaped by means of a nozzle or of a dipping body and for being solidified by means of a precipitating bath.

The precipitating bath may consist, according to the invention, of an aqueous and/or alcoholic solution of basic reacting substances. These substances may be preferably bodies which bind wholly or partially the free or bound formaldehyde contained in the spinning solution owing to its preparation, as for instance, anhydrous ammonia, hydrazine hydrate, mono- or di- or triethanolamine, ethylenediamine and derivatives of these compounds. The precipitation speed depends, as it has been shown in practice, on the size of the molecules of the coagulating means because the coagulation process will be retarded with increasing molecule size.

Furthermore experiments have proved that the primary solidification of the coagulum is favoured by adding mineral salts, particularly sodium phosphate, to the precipitating bath and, more-over, an acceleration of the solidification may be obtained also by providing after the coagulating bath mineral salt baths which may be heated for increasing their favourable action. All the neutral salts may be used and tri-sodium phosphate has been shown particularly useful.

The threads or foils or tubes formed from the amylose solution prepared according to the invention will be subjected after the coagulation to a washing operation and to an aftertreatment and then to a plasticising and finally to a drying action in the manner known for other spinning solutions. The strength of the finished product may be augmented, if necessary, by treating the threads, foils or tubes once or more than once with elevated temperatures.

Example

Amylose is mixed 1 hour and 30 minutes in a kneading machine at 20° C. with a mixture consisting of water and formaldehyde and brought to a pH-value of 3.0 by means of phosphoric acid or sulphuric acid. The so obtained total mixture is introduced in cold state in a stirring autoclave and rapidly heated to 120° C. The dissolving operation is completed after a heating of 5 minutes at this temperature and the solution will be spread, after deaeration, filtering and cooling, by means of a broad slit nozzle into a precipitating bath consisting of anhydrous ammonia having a concentration of about 20% and containing 5% $Na_3PO_4$ solved therein. The paste issuing from the slit nozzle coagulates practically immediately to a gel band which shows already after few seconds in the wet state a strength sufficiently high for being conducted over a guiding roll from which it is continuously drawn off from the precipitating bath and led to the washing and aftertreatment baths.

The solution prepared and used for spinning this foil contains 25.6 percent solids and has a content of formaldehyde amounting to 6.5 percent and a pH-value of 3.0 and a viscosity of 231.3 poises.

The produced foil shows:

A breaking load of 6.2 kg./mm.$^2$
An extension of 8%.
A folding number of 2208
A swelling degree of 2.1
A formaldehyde content of 0.6
A thickness of 53$\mu$

What I claim is:

1. A process for the production of threads, foils, tubes and the like from at least one of the substances selected from the group consisting of amylose and starch carbohydrates containing amylose, which comprises dissolving said substance in a mixture of water with formaldehyde, in quantities twice to six times the volume of said substance, at a temperature of approximately 120° C., allowing the viscosity of the solution to reach 50–100 poises by storing the same at room temperature until said viscosity has been attained, and adjusting the pH to 2.5–3.5, shaping the product thus obtained to the desired structure, introducing the shaped structure into a spinning bath, therein coagulating and solidifying the product, and washing, plasticizing and drying the same.

2. The process as claimed in claim 1, wherein the coagulation and solidification is effected in a precipitating bath consisting of a solution of at least one basic substance, selected from the group consisting of anhydrous ammonia, hydrazine hydrate, mono-, di- and triethanolamine, ethylene diamine, and derivatives thereof, in a solvent selected from the group consisting of water, alcohol and mixtures thereof.

3. The process according to claim 2, wherein coagulation and solidification are accelerated by adding to said precipitating bath a neutral mineral salt.

4. The process as claimed in claim 3, wherein said neutral mineral salt is a sodium phosphate.

5. The process according to claim 2, wherein the treatment in said precipitating bath is followed by immersion of the coagulated and solidified substance in a bath containing at least one neutral mineral salt.

6. The process as claimed in claim 5, wherein said salt is a sodium phosphate.

7. The process as claimed in claim 1, wherein said substance is dissolved in 2.5 to 3.1 times the volume of said substance of water containing approximately 10 percent formaldehyde and the pH is adjusted to 2.8 to 3.1.

References Cited in the file of this patent
UNITED STATES PATENTS 2,417,611   Pierson _____ Mar. 18, 1947

OTHER REFERENCES

Kerr, R. W.: "Chemistry and Industry of Starch," 2nd ed. (1950), pages 466–472.